United States Patent [19]

Logsdon

[11] 4,350,372
[45] Sep. 21, 1982

[54] EXPANSION COUPLING FOR LARGE DIAMETER PLASTIC PIPES

[76] Inventor: Duane D. Logsdon, 1708 Calavera Dr., Fullerton, Calif. 92631

[21] Appl. No.: 170,477

[22] Filed: Jul. 21, 1980

Related U.S. Application Data

[63] Continuation-in-part of Ser. No. 114,051, Jan. 21, 1980.

[51] Int. Cl.³ ............................................. F16L 27/12
[52] U.S. Cl. .................................... 285/45; 285/226; 285/301
[58] Field of Search ................ 285/45, 226, 227, 228, 285/229, 301, 300, 371

[56] References Cited

U.S. PATENT DOCUMENTS

| 337,037 | 3/1886 | White | 285/301 X |
| 1,726,483 | 8/1929 | Giesler | 285/45 X |
| 1,786,506 | 12/1930 | Ray | 285/301 X |
| 1,968,715 | 7/1934 | Slade | 285/300 |
| 2,565,296 | 8/1951 | Chyle | 285/301 X |
| 2,911,238 | 11/1959 | Myers et al. | 285/301 X |
| 2,931,669 | 4/1960 | McDonald | 285/45 |
| 3,061,039 | 10/1962 | Peters | 285/49 X |
| 3,834,741 | 9/1974 | Drake | 285/226 |
| 3,837,685 | 9/1974 | Miller | 285/226 X |
| 3,873,137 | 3/1975 | Yamaguchi | 285/226 |
| 4,101,151 | 7/1978 | Ferguson | 285/236 |

FOREIGN PATENT DOCUMENTS

| 342692 | 10/1921 | Fed. Rep. of Germany | 285/226 |
| 2114180 | 9/1972 | Fed. Rep. of Germany | 285/45 |
| 2318379 | 2/1977 | France | 285/226 |
| 518754 | 3/1940 | United Kingdom | 285/226 |

*Primary Examiner*—Thomas F. Callaghan
*Attorney, Agent, or Firm*—K. H. Boswell; Edward D. O'Brian

[57] ABSTRACT

An expansion coupling connecting a first pipe with a second pipe includes an imperforate expansion member having a first cylindrical end capable of fitting to and forming an impervious fluid seal with the first pipe and a second cylindrical end capable of fitting to and forming an impervious fluid seal to the second pipe. Integrally formed with and interspaced between the first and second cylindrical ends is an expandable, contractable bellows. A sliding sleeve fits over the expansion member and both protects it and prevents distortion of the bellows portion of the expansion member. The sliding sleeve has a first sleeve member, a portion of which connects to the first pipe and a portion of which extends over the bellows, and a second sleeve member, a portion of which connects to the second pipe and a portion of which slides over that portion of the first sleeve member located over the bellows. As the bellows expands and contracts the respective sleeve members slide with respect to each other.

5 Claims, 6 Drawing Figures

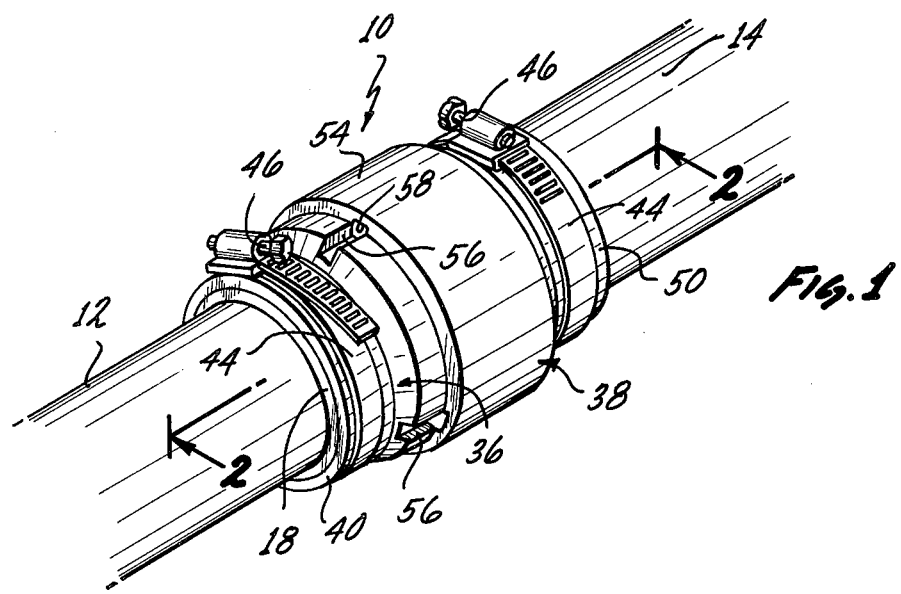
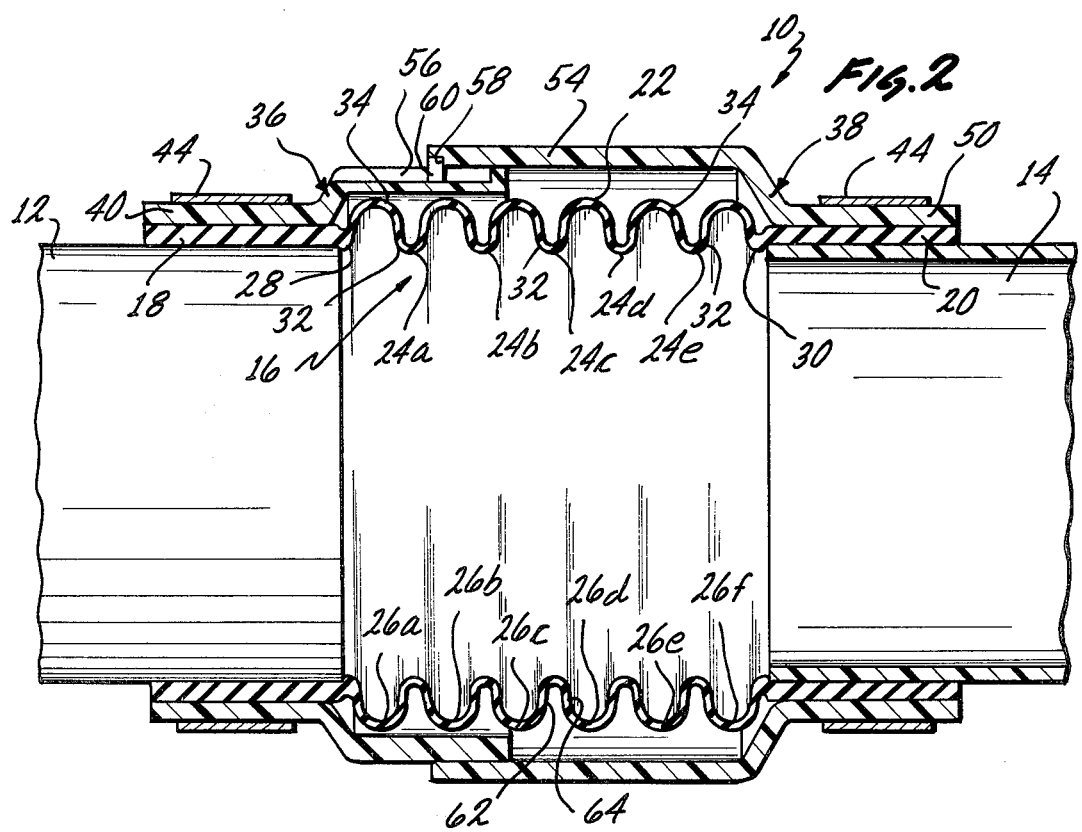

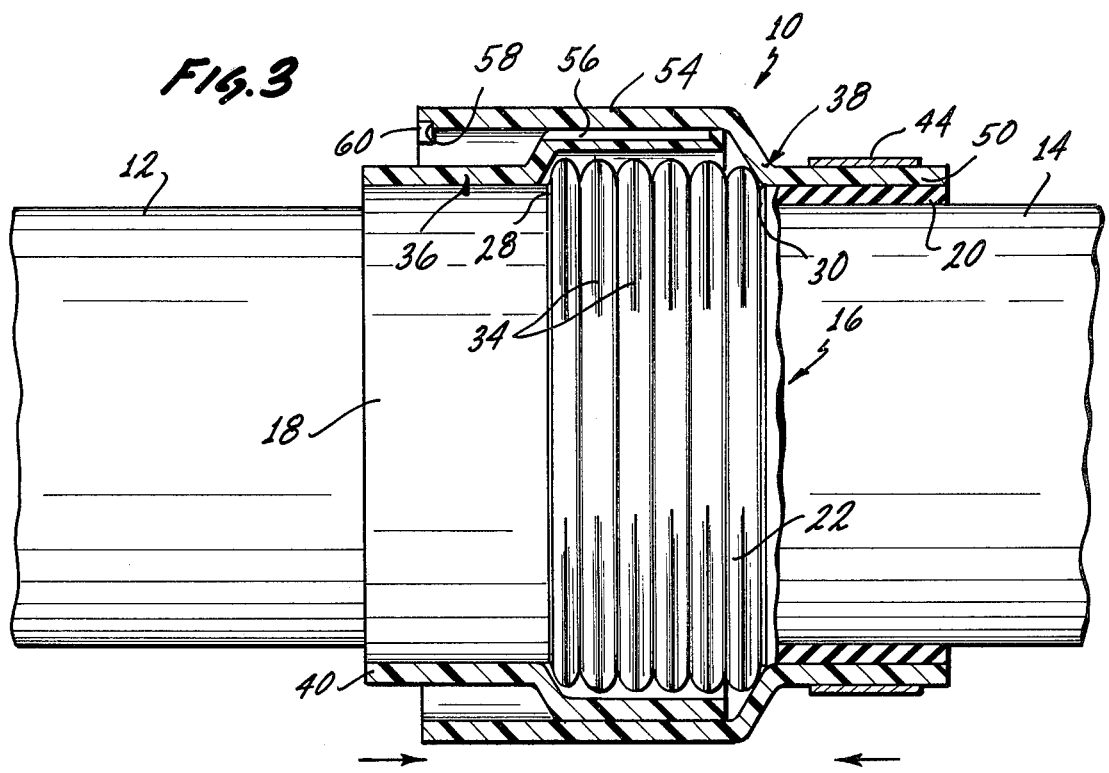
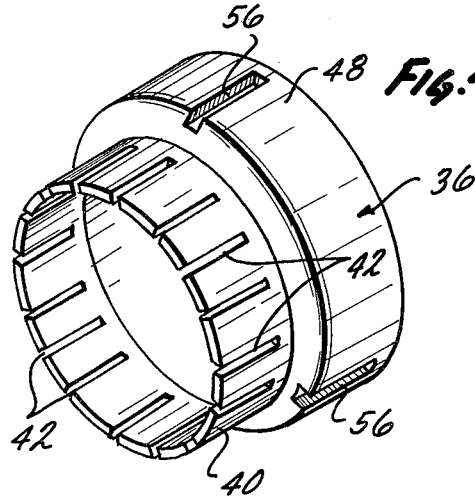
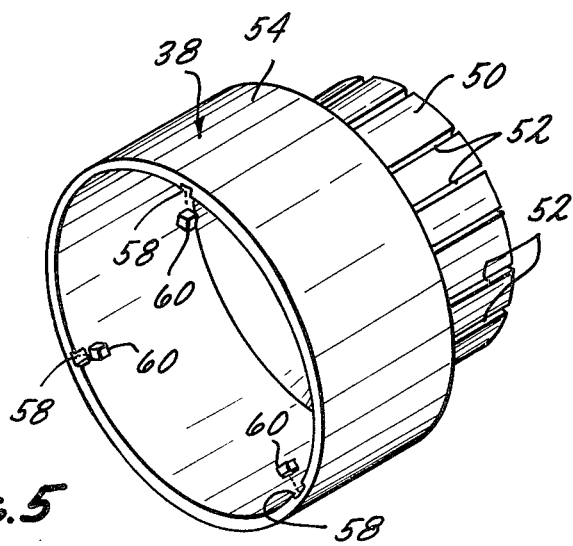

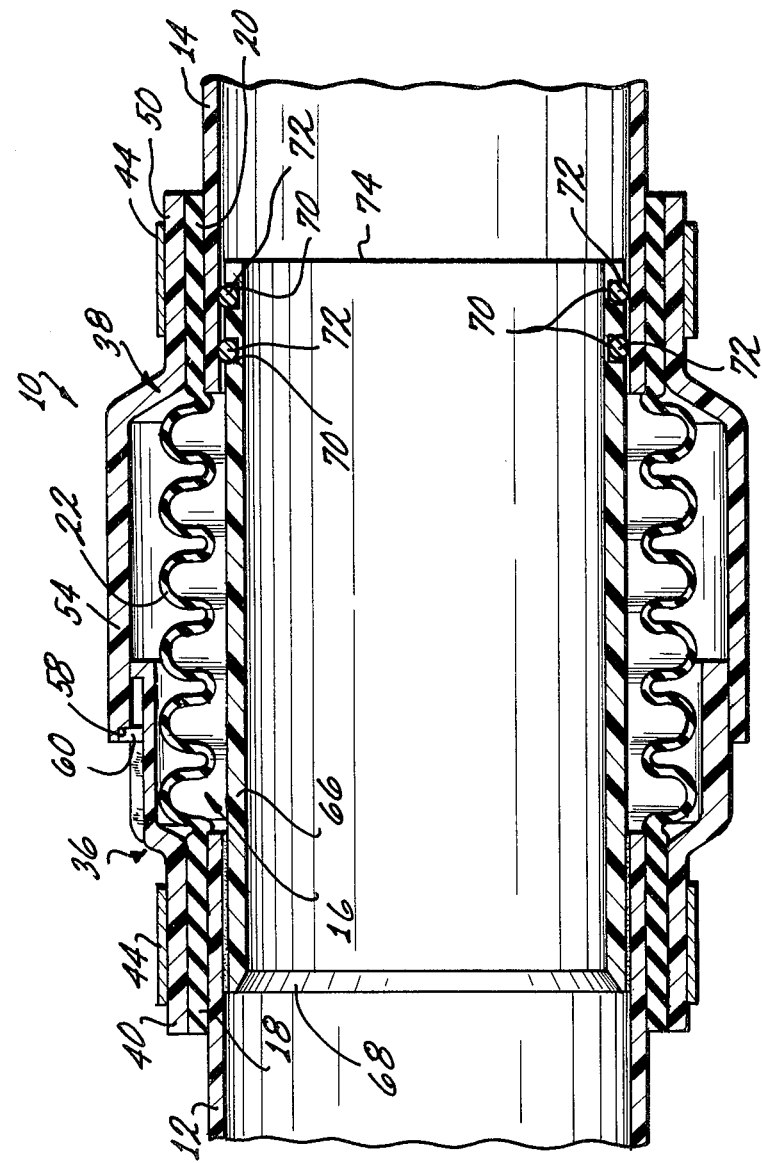

EXPANSION COUPLING FOR LARGE DIAMETER PLASTIC PIPES

CROSS-REFERENCE TO RELATED APPLICATIONS

This invention is a continuation-in-part of my invention set forth in application Ser. No. 114,051 filed Jan. 21, 1980 entitled "EXPANSION COUPLING FOR LARGE DIAMETER PLASTIC PIPES", and now abandoned the entire disclosure of which is herein incorporated by reference.

BACKGROUND OF THE INVENTION

An expansion coupling connecting a first pipe to a second pipe is described which includes a bellows section which is fixedly held between a first and second pipe and has a protective sliding sleeve which fits over the bellows section.

The use of plastic pipe in all forms of construction is rapidly expanding. Plumbing codes now allow for large diameter pipes from sizes of from three inches up to eight inches or greater to be used as sewer pipes, vent pipes, drain pipes and the like. As with all pipes these large diameter plastic pipes are subject to expansion-contraction forces introduced from several sources.

A long length of pipe will itself be subject to thermo-expansion. Additionally, when a long length of pipe is used within a structure and is fixed to opposing points within that structure, when the structure expands or contracts because of thermo effects, if the pipe is fixed at the two points to the structure, expansion of the structure will introduce strain into the pipe or at the joining points.

To accommodate expansion in pipes it is possible to telescope one piece of pipe into a second; however, this requires for very accurate sizing of the pipe so that leaks will not develop at such a joint. Such accurate sizing is expensive which detracts from one of the main advantages of plastic pipe.

In high rise structures it has been found that it is necessary to incorporate an expansion joint at least approximately every 20 to 30 feet for vertically running pipe. It would be further possible to connect these sections of plastic pipe with a simple bellows. However, when many sections of pipe are connected, large pressure heads can develop in these pipes. If a simple bellows connection was used the pressure developed in the pipe could distort the bellows section outwardly and could rupture them.

BRIEF SUMMARY OF THE INVENTION

It is a broad object of this invention to provide an expansion coupling capable of connecting a first pipe to a second pipe which is useful for large diameter plastic pipe and which will form a leak-proof seal between the pipes. It is a further object to provide an expansion coupling which is not susceptible to pressure deformation and which can be used with mass-produced pipes which have limited tolerances. It is a further object to provide a coupling which, because of its simplicity, is economical to manufacture, and thus susceptible of wide commercial acceptance.

These and other objects as will be evident from the remainder of this specification are achieved by an expansion coupling connecting a first pipe and a and a second pipe which comprises: an imperforate expansion means including a bellows means interspaced between said first pipe and said second pipe, said bellows means having a first end and a second end, a first connecting means connecting one of said first end or said second end of said bellows means to one of said first or said second pipe, a second connecting means connecting the other of said first end or said second end of said bellows means to the other of said first or said second pipe; at least one sliding sleeve means coaxially located with and connecting to one of said first or said second pipes and extending coaxially with said bellows means toward the other of said first or said second pipes, said bellows means movable with respect to said sliding sleeve means.

Preferably said sliding sleeve means includes two sleeve members each having a first portion which can be fixedly located coaxially, one around said first pipe and one around said second pipe, the remaining portion of one of said sleeve members slidably located within the remaining portion of the other of said sleeve members and each of said sleeve members having an attachment means to attach it to the pipe on which it is located.

Said bellows means includes a flexible bellows section between the respective first and second cylindrical members which is shaped such that when viewed in cross-section along the longitudinal axis of the bellows the edge of the bellows has a sinusoidal shape. Further, this sinusoidal shape can be constructed so that the arcuate sectors of the bellows projecting toward the interior of the bellows have a radius which is smaller than the radius of the arcuate sector of the bellows which project away from the interior of the bellows.

Further, for high pressure usage, said expansion coupling can include an internal sleeve member extending within said expansion means and having one end sealably attaching to the interior of one of said first or said second pipes. The internal sleeve member extends through the interior of the bellows means to the interior of the other of said first or second pipe and is capable of forming a movable seal against the interior of the other of said first or said second pipes.

BRIEF DESCRIPTION OF THE DRAWINGS

This invention will be better understood when taken in conjunction with the drawings wherein:

FIG. 1 is an isometric view of the invention as used to couple a first pipe to a second pipe;

FIG. 2 is a side-elevational view in section about the line 2—2 of FIG. 1;

FIG. 3 is a side-elevational view in partial section similar to FIG. 2 except showing the components of the invention in a different spatial relationship with respect to one another;

FIG. 4 is an isometric view of the component which is shown in section on the left-hand side of FIG. 3;

FIG. 5 is an isometric view of the component which is shown in section on the right-hand side of FIG. 3 modified to show certain portions of this component in an exploded manner; and FIG. 6 is a side elevational view in section similar to FIGS. 2 and 3 but with the addition of an internal sliding member.

This invention uses certain principles and/or concepts as are set forth and defined in the claims appended to this specification. Those skilled in the plumbing arts to which this invention pertains will realize that these principles and/or concepts can be used in a number of differently appearing embodiments, differing from the exact embodiment described in this specification and illustrated in the drawings. For this reason, this invention is to be construed in light of the claims and is not to be construed as being limited to the exact embodiment herein presented.

DETAILED DESCRIPTION

The expansion coupling 10 of the invention connects two pipes, labeled 12 and 14 respectively in the drawings, together in such a manner that pipes 12 and 14 can move along the longitudinal axis running through the center of both respective pipes toward and away from each other. The expansion coupling 10 is formed of several components.

An expansion member 16 has a cylindrical section 18 on one end and an identical cylindrical section 20 on the other end. These cylindrical sections have an inside diameter equal to the outside diameter of the pipes 12 and 14 such that when they are slid onto the pipes they are capable of mating with the pipes 12 and 14. Interspaced between the cylindrical sections 18 and 20 is a bellows section 22. The bellows section 22 is composed of a plurality of inwardly directing ribs collectively identified by the numeral 24 and a plurality of outwardly directing ribs collectively identified by the numeral 26. The ribs 24 and 26 are integrally formed with each other such that in a cross-section taken across the longitudinal axis of the expansion member 16 as illustrated in FIG. 2 these ribs form a sinusoidal pattern with each other.

Where outwardly directing ribs 26A and 26F meet with cylindrical sections 18 and 20 respectively, an annular lip, 28 and 30 respectively, is formed. These lips 28 and 30 project outwardly toward the center of the expansion member 16 and serve to position the pipes 12 and 14 and the cylindrical sections 18 and 20. When the expansion member 16 is slid over the pipes 12 and 14 the cylindrical sections 18 and 20 are slid on to the pipes 12 and 14 until the edges of the pipes meet with and abut against the lips 28 and 30.

The inwardly directed ribs 24 project inwardly within expansion member 16. The amount of their projection, however, is less than the internal diameters of the pipes 12 and 14. Thus, the channel through the expansion member 16 is larger than or equal to the size of the channel inside of the pipes 12 and 14. Because of this, the expansion member 16 does not present any constriction in the flow pathway through the pipes 12 and 14, i.e., there is no throttling effect by the expansion member 16.

The arcuate sectors collectively identified by the numerals 32 of the inwardly directed ribs 24 are of a smaller diameter than the arcuate sectors collectively identified by the number 34 of the outwardly directed ribs 26. The differences in radii of the two groups of the arcuate sectors 32 and 34 result in the internal diameter of the expansion member 16, most specifically the bellows section 22, remaining somewhat of a constant value as the bellows section 22 is expanded or contracted. This differs from the typical accordian folded bellows used in common air pumps, musical instruments, etc. where because of the sharp angles between the individual sections of the bellows, when the bellows is contracted the interior of the bellows, i.e., as viewed along its longitudinal axis, can become smaller.

Placed on the outside of the expansion member 16 to protect the expansion member 16 and to limit any outward expansion of the expansion member 16 because of pressure within the pipes 12 and 14 are two sleeve members 36 and 38 respectively. Sleeve member 36 has a first section shaped as a collar 40 which fits around cylindrical section 18 of expansion member 16 and therefore also around pipe 12. The sleeve member 38 can be provided with a series of cutouts or notches 42 essentially as illustrated in FIG. 4. The sleeve member 36 is fixedly attached to pipe 12 with a band clamp 44 as illustrated in FIG. 1. The band clamp 44 is of the common type generally made out of stainless steel so that it resists corrosion and is tightened by turning the worm screw 46. Because of the cutouts 42 in collar 40 the collar 40 can be squeezed around cylindrical section 18 of the expansion member 16 which in turn is squeezed onto pipe 12 forming a fluid impervious seal between the expansion member 16 and the pipe 12.

The other portion of sleeve member 38 comprises a collar 48 of a larger diameter than collar 40. The collar 48 is integrally formed with collar 40. The collar 48 is sized such that its internal diameter is slightly larger than the external diameter of bellows section 22 measured around outwardly directed ribs 26.

Sleeve member 38 is composed of a collar 50 identical to collar 40 including a plurality of cutouts 52. It is mounted around cylindrical section 20 of expansion member 16 and pipe 14 in an identical manner with a band clamp 44 as was collar 40. The other section of sleeve member 38 consists of a collar 54 integrally formed with collar 50 and having an internal diameter incrementally larger than the external diameter of collar 48. This allows collar 48 to fit within collar 54 and slide back and forth within collar 54 as pipe 12 moves with respect to pipe 14. Together sleeve members 36 and 38 form an expandable and contractable cover for expansion member 16 protecting expansion member 16 and serving to form a rigid container for expansion member 16 should it be distorted outwardly by pressure inside of the pipes 12 and 14.

Extending longitudinally in the surface of the collar 48 are a plurality of channels collectively identified by the numeral 56. Collar 54 has a plurality of notches 58 equal in number to the plurality of channels 56 and positioned on collar 54 such that when collar 48 is slid inside of collar 54 each of the notches 58 is aligned directly over one of the channels 56. In mounting the expansion coupling 10 to the pipes 12 and 14, first the sleeve member 36 including a band clamp 44, is slid onto pipe 12 and the sleeve member 38 including a band clamp 44 is slid onto pipe 14. Next, the expansion member 16 is slid over the respective ends of pipes 12 and 14. The sleeve member 36 is slid up over cylindrical section 18 of expansion member 16 and fixedly locked there by tightening the band clamp 44. Next, the sleeve member 38 is slid over cylindrical section 20 of expansion member 16 concurrently with its collar portion 54 being slid over collar 48 of sleeve member 36. The sleeve member 38 is pushed all the way over sleeve member 36 as depicted in FIG. 3. This locates notches 58 over the area of collar 40. When this is done a plurality of small keys 60 engage in the channels 56. This is essentially depicted in FIG. 2. The band clamp 44 can then be tightened around collar 50 to fixedly attach sleeve member 38 to pipe 14.

While the expansion coupling 10 shown in the embodiment illustrated in the drawings includes two sleeve members 36 and 38, an alternate embodiment could contain only a single sleeve member. This sleeve member would be sized to extend completely over the bellows section 22 when the bellows section 22 was totally expanded to the limits allowed based upon the number of ribs it contained. For this embodiment the single sleeve would be fixedly attached over one or the other of the cylindrical sections 18 and 20 attaching that cylindrical section to its respective pipe. The other cylindrical section 18 or 20 would be directly attached to the other pipe, either via a band clamp 44 directly on it or including a spacing collar which would essentially be constructed to mimic either collar 40 or 48. This spacing collar would thus simply be a cylindrical band.

In a further alternate embodiment of the invention the cylindrical sections on the ends of the bellows can be located inside of the pipes 12 and 14 by solvent molding and the sleeve member or member directly attached to the pipes 12 and 14. For the embodiment shown in the drawings and the embodiment described in the preceding paragraph any and all sleeve members 36 and 38, or attaching collars, preferredly would be formed of a polyethylene base TPR thermoplastic. The expansion member 16 preferredly is formed of a synthetic rubber capable of maintaining its flexibility over a long useful life. As noted previously, the band clamps 44 are preferredly stainless steel to resist corrosion.

When the expansion coupling 10 is spliced into a line of pipe the coupling 10 effectively serves as an insulator to restrict or retard propagation of noise and/or vibration along the pipe. The expansion member 16, since it is formed of a rubbery material, simply will not propagate any vibration or noise between the pipe 12 and the pipe 14. Since the sleeve members 36 and 38 are physically separated from the pipes 12 and 14 by the cylindrical sections 18 and 20 of the expansion member 16, they too are separated from the pipes 12 and 14 by a material incapable of transmitting vibrations or noise and thus vibrations and noise will not be conducted from one of the pipes 12 to the other of the pipes 14 via the sleeve members 36 and 38.

In certain installations wherein the expansion coupling 10 would be located between two horizontally oriented pipes, such as when the pipes are used to drain a roof scupper which is in the center of a building, there is the likelihood that sand and dirt from the outside environment can be washed by rain into this horizontally oriented pipe and become lodged in the folds between the ribs 24 and 26 of the bellows section 22. Because of the shape of the ribs 24 and 26, the expansion coupling 10 will clean itself out should water flow cease and sand and dirt become lodged between the ribs 24 and 26 when the water remaining within the expansion coupling 10 evaporates. This self-cleaning will happen because the next time the expansion coupling 10 either contracted or expanded with expansion or contraction movement of one or the other of the pipes 12 or 14 the ribs 24 and 26 will flex about their arcuate sectors 32 and 34 such that the essentially short segments of material exemplified by segment 62 in drawing 2 will move toward or away from the adjacent segment exemplified by segment 64. This will cause any deposit of dirt or sand located adjacent to the segments 62 and 64 to be broken up and the next time fluid flows through the expansion coupling 10 this fluid will clean out this sand or dirt. Thus, because of the shape of the expansion coupling, sand and dirt will not remain trapped in it due to the self-cleaning or flushing action of fluid flow following breakup of deposits located in the bellows section 22.

Referring now to FIG. 6, for use in installation wherein the pipes 12 and 14 will be utilized to conduct a high pressure fluid, a sliding internal sleeve member 66 is positioned within the interior of the bellows section 22. End 68 of sleeve member 66 is solvent welded to the interior of pipe 12. This end 68 has a beveled surface extending from its outside wall toward its inside wall thus presenting an oblique surface to flow of fluid moving from pipe 12 to pipe 14. The internal sleeve member extends from pipe 12 to pipe 14. Extending around the outside circumference of the internal sleeve member 66 are identical annular channels 70. Positioned within the annular channels 70 are identical O-rings 72.

The external diameter of internal sleeve member 66 is chosen to correspond closely to the internal diameter of pipes 12 and 14. No exacting tolerances are required, however, in that the internal sleeve member 66 is solvent welded to pipe 12, thus forming a reasonable pressure resistant seal and the differences between the external surface of internal sleeve member 66 and the internal surface of pipe 14 is taken up by the presence of O-rings 72.

O-rings 72 form a seal with internal sleeve member 66 within the annular channels 70 and form a tight seal with the internal surface of pipe 14. The O-rings 72, however, are free to move against the internal surface of pipe 14. As pipe 12 and 14 move with respect to one another because of expansion and contraction, as previously noted, internal sleeve member 66, because it is fixedly attached to pipe 12, moves with pipe 12. The O-rings 72 are fixedly locked in the annular channel 70 and thus they are capable of being maintained within these annular channels, but sliding along the internal surface of pipe 14. As a result, end 74 of internal sleeve member 66 moves within pipe 14 but the O-rings 72 maintain a pressure seal against pipe 14. The O-rings additionally serve as a flexible membrane between pipe 12 (in reality, internal sleeve member 66) and pipe 14 to inhibit propagation of noise from one to the other.

The utility of the embodiment depicted in FIG. 6 would be in constructions wherein a sufficient pressure head could be developed within the interior of the pipes 12 and 14 such as at the bottom of a high rise structure. By so locating the internal sleeve member 66 within this expansion coupling 10, the bellows section 22 is relieved of being exposed to excessive pressures. The bellows section 22 of course will withstand moderate pressures in that with moderate pressures the bellows is sufficiently supported by sleeve members 36 and 38. The internal sleeve member 66 augments sleeve members 36 and 38 in high pressure situations. Internal sleeve member 66 can be constructed of the same type of material as sleeve members 36 and 38, of polystyrene or the like.

I claim:

1. An expansion coupling connecting a first pipe and a second pipe which comprises:
    an imperforate expansion means having a first cylindrical member capable of coaxially fitting around and being sealed to a first pipe and a second cylindrical member coaxially fitting around and being sealed to a second pipe and a cylindrical bellows means integrally formed with and interspaced between said first and said second cylindrical members;
    a sliding sleeve means including a first and a second sleeve member, said first sleeve member having a first circular collar and a second circular collar integrally formed together, said second sleeve member having a third circular collar and a fourth circular collar integrally formed together, said first and third cylindrical collars including cutouts means enabling said first and third collars to be squeezed so as to reduce in diameter, said second and fourth collars being circumferentially continuous, said first collar fitting coaxially around said first cylindrical member to locate said first cylindrical member between said first pipe and said first collar of said first sleeve member, said third collar fitting coaxially around said second cylindrical member to locate said second cylindrical member between said second pipe and said third collar of said second sleeve member, said second collar coaxially located around at least a portion of said bellows means, said portion of said bellows means movable within said second collar, said fourth collar coaxially located around said second collar, said second collar slidably movable within said fourth collar;

a first and a second attaching means for fixedly attaching said first collar of said first sleeve member and said first cylindrical member to said first pipe and said third collar of said second sleeve member and said second cylindrical member to said second pipe respectively;

said cylindrical bellows means comprising a cylindrical flexible member formed into a bellows such that a cross-section through the longitudinal axis of said cylindrical flexible member has a sinusoidal shape, said sinusoidal shape defining a plurality of arcuate sectors alternately pointing toward the center of said cylindrical flexible member and away from the center said cylindrical flexible member, said bellows sized such that the internal diameter of said bellows measured across said arcuate sectors of said bellows projecting toward the interior of said bellows is greater than the inside diameter of either of said first or said second pipes;

an internal sleeve member extending within the interior of said expansion means and having one end sealably attached to the interior of one of said first or said second pipes and extending from said attachment through the interior of said bellows means and movably sealing against the interior of the other of said first or said second pipe;

said second circular collar having a plurality of channels extending from said first circular collar longitudinally along a portion of its outside surface to a point proximal to the end of said second circular collar which is distal from said first circular collar and extending radially from said outside surface through a portion of said second collar;

said fourth circular collar including a plurality of projections equal in number to the number of said channels and projecting inwardly from the end of said fourth circular collar distal from said third circular collar;

said projections fitting in said channels guiding the sliding movement of said second circular collar within said fourth circular collar and preventing complete disengagement of said second circular collar from said fourth circular collar.

2. The expansion coupling of claim 1 wherein:
the arcuate sectors of said bellows projecting toward the interior of said flexible cylinder have a radius smaller than the radius of the arcuate sectors of said bellows projecting away from the interior of said flexible cylinder.

3. The expansion coupling of claim 1 including:
a lip means located at each end of said bellows at the point wherein said bellows attaches to said first and second cylindrical member, said lip means preventing said first and said second pipe from extending into the interior of said bellows.

4. The expansion coupling of claim 1 including:
at least one annular channel circumferentially extending about the exterior of said internal sleeve member and positioned on said internal sleeve member on that portion of said internal sleeve member which movably seals against the interior of the other of said first or said second pipe;
an O-ring fitting within said annular channel and capable of forming a seal between said annular channel and said other of said first or said second pipe, said seal capable of being maintained as said internal sleeve member moves within the other of said first or said second pipe.

5. The expansion coupling of claim 1 wherein:
the arcuate sectors of said bellows projecting toward the interior of said flexible cylinder have a radius smaller than the radius of the arcuate sectors of said bellows projecting away from the interior of said flexible cylinder;
and including;
a lip means located at each end of said bellows at a point wherein said bellows attaches to said first and second cylindrical member, said lip means preventing said first and said second pipe from extending into the interior of said bellows;
at least one annular channel circumferentially extending about the exterior of said internal sleeve member and positioned on said internal sleeve member on that portion of said internal sleeve member which movably seals against the interior of the other of said first or said second pipe;
an O-ring fitting within said annular channel and capable of forming a seal between said annular channel and said other of said first or said second pipe, said seal capable of being maintained as said internal sleeve member moves within the other of said first or said second pipe.

* * * * *